United States Patent
Hu et al.

(10) Patent No.: US 9,307,404 B2
(45) Date of Patent: Apr. 5, 2016

(54) MOBILE TERMINAL AND NETWORK UNLOCKING METHOD AND SYSTEM THEREOF

(75) Inventors: Guangyu Hu, Shenzhen (CN); Cuirong Huang, Shenzhen (CN); Yanjin She, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 281 days.

(21) Appl. No.: 14/001,147

(22) PCT Filed: Apr. 20, 2011

(86) PCT No.: PCT/CN2011/073038
§ 371 (c)(1),
(2), (4) Date: Aug. 22, 2013

(87) PCT Pub. No.: WO2012/126191
PCT Pub. Date: Sep. 27, 2012

(65) Prior Publication Data
US 2013/0331062 A1  Dec. 12, 2013

(30) Foreign Application Priority Data
Mar. 21, 2011 (CN) .......................... 2011 1 0067982

(51) Int. Cl.
H04M 1/66 (2006.01)
H04W 12/06 (2009.01)
H04W 8/24 (2009.01)

(52) U.S. Cl.
CPC .............. *H04W 12/06* (2013.01); *H04W 8/245* (2013.01)

(58) Field of Classification Search
CPC .... G06F 21/572; H04W 12/06; H04W 4/003; H04W 8/183; H04W 12/08; H04W 8/26; H04W 4/001; H04W 4/14; H04L 41/0853; H04L 63/083
USPC .................................................. 455/410, 411
See application file for complete search history.

(56) References Cited

U.S. PATENT DOCUMENTS

| 2008/0090614 | A1* | 4/2008 | Sicher et al. ................... 455/558 |
| 2008/0227432 | A1 | 9/2008 | Lavabre et al. |
| 2010/0210240 | A1 | 8/2010 | Mahaffey et al. |
| 2011/0302660 | A1* | 12/2011 | Mahalingaiah ................. 726/28 |

FOREIGN PATENT DOCUMENTS

| CN | 101026834 A | 8/2007 |
| CN | 101631310 A | 1/2010 |
| CN | 101651942 A | 2/2010 |
| CN | 101742483 A | 6/2010 |
| EP | 1853019 A1 | 11/2007 |
| EP | 2640105 A1 | 9/2013 |
| WO | 03100629 A1 | 12/2003 |

OTHER PUBLICATIONS

Chengjuan Zhao, Authorized Officer, The State Intellectual Property Office, the P.R. China, "International Search Report" in connection with related International Patent App. Serial No. PCT/CN2011/073038, Dec. 29, 2011, 4 pages.

* cited by examiner

*Primary Examiner* — Olumide T Ajibade Akonai
*Assistant Examiner* — Edward Zhang
(74) *Attorney, Agent, or Firm* — Ling Wu; Stephen Yang; Ling and Yang Intellectual Property

(57) ABSTRACT

A network unlocking method of a mobile terminal is disclosed in the invention. The method includes: after being used, a mobile terminal whose network is locked transmitting hardware information to a network sever (101); when the mobile terminal needs to unlock the network, it logging in a website providing the download of a network unlocking file, the website obtaining the hardware information of the currently logging-in mobile terminal and performing hardware information matching by the network server (103); when the matching is successful, the mobile terminal downloading the network unlocking file from the website and unlocking the network with an unlocking code in the network unlocking file. A mobile terminal and a network unlocking system thereof are also disclosed in the invention.

10 Claims, 2 Drawing Sheets

MOBILE TERMINAL AND NETWORK UNLOCKING METHOD AND SYSTEM THEREOF

TECHNICAL FIELD

The invention relates to unlocking technologies in mobile communication, and more particularly, to a mobile terminal and a network unlocking method and system thereof.

BACKGROUND OF THE RELATED ART

Customized mobile terminal sales gradually become a trend, for example, in order to obtain more wireless network users, operators often launch a marketing strategy that customers can get mobile phones for free if they pay the mobile phone bills, in which case, in order to ensure that customers use the operators' own networks, operators require to add a network locking function to their customized mobile phones such that customers can only use the operators' own networks.

Mobile phones with a network locking function can only use a specific operator's Subscriber Identity Module (SIM) card. When the mobile phone detects that the Mobile Country Code (MCC) and Mobile Network Code (MNC) of a SIM card inserted into the mobile phone are inconsistent with the preset parameters within the mobile phone, it does not allow the mobile phone to search for the corresponding service network. The network locking of the mobile phone brings along the benefits of retaining customers for the operators, but in some countries or in some cases, the network must be unlocked for a network locked mobile phone. For example: some countries do not allow network locking, or restricts that the mobile phone can only be network locked for a certain period of time.

Currently, there lacks alternative methods for network unlocking. The user needs to hand the mobile phone to service personnel of the mobile phone manufacturer, and the service personnel uses a special unlocking software tool to unlock the network, whose implementation is relatively cumbersome.

For example, in the application "method and system for unlocking locked network of terminal" (Application No.: CN200910188960), by interconnecting the SIM TOOL KIT (STK) module of the SIM card with the operator's remote server, the remote server can poll the unlocking time in real time, and sends an AT command for unlocking to the mobile phone which meets the unlocking time, so as to unlock the mobile phone. The disadvantage of the application is that the authentication of the unlocking time is relatively complicated; since it requires that the STK module of the SIM card support the network unlocking service, when the SIM card is changed, the corresponding data on the remote server need to be updated. For another example, in an application for a method for encrypting and decrypting mobile terminal network locking/card locking unlock code" (CN200810110663), a method for encrypting and decrypting the unlocking code with asymmetric keys is disclosed, but the problem about how the mobile terminal acquires the unlocking code and unlocks the network is not involved.

SUMMARY OF THE INVENTION

For the above reasons, the main purpose of the invention is to provide a mobile terminal and a network unlocking method and system thereof so that the unlocking manner is not affected by the change of a SIM card, or restricted by whether said SIM card supports the unlocking method or not.

To achieve the above-mentioned purpose, the technical solution of the invention is achieved as below:

the invention provides a method for a mobile terminal unlocking a network, after said mobile terminal whose network is locked is in use, said method comprises the following steps of:

said mobile terminal sending hardware information to a network server;

said mobile terminal logging in a website which provides download of a network unlocking file when network unlocking is needed, said website acquiring said hardware information of said mobile terminal that is currently logging in, and performing hardware information matching through said network server, if the matching is successful, said mobile terminal downloading said network unlocking file from said website, and unlocking the network with an unlocking code in said downloaded network unlocking file.

In the above-mentioned scheme, after said mobile terminal sends said hardware information to said network server, said method further comprises: said network server starting up a remaining network locking time-length timer to time a remaining network locking time length corresponding to said hardware information.

In the above-mentioned scheme, prior to the above steps, said method further comprises: said network server pre-recording network unlocking information of said mobile terminal in a database; the step of said network server starting up said remaining network lock time-length timer to time the remaining network locking time length corresponding to said hardware information is:

said network server receiving a short message containing said hardware information sent by said mobile terminal, and searching out a corresponding remaining network locking time length in said network unlocking information according to said hardware information, and in accordance with said remaining network locking time length, starting up said remaining network locking time-length timer.

In the above-mentioned scheme, said network unlocking information comprises: user name, password, hardware information, unlocking state, remaining network locking time length, and unlocking file name obtained by a user when the user purchases or obtains said mobile terminal for logging in the website to download said network unlocking file.

In the above-mentioned scheme, said hardware information comprises at least an International Mobile Equipment Identity (IMEI) of said mobile terminal.

In the above-mentioned scheme, the step of performing hardware information matching is: said network server searching in the database for hardware information consistent with said hardware information acquired from said website that provides the download of said network unlocking file, and the matching being successful when said hardware information is searched out, and if the unlocking state corresponding to said hardware information is locked, and the remaining network locking time length is 0.

In the above-mentioned scheme, the step of downloading said network unlocking file from said website is: said network server sending to said website a matching successful instruction carrying an unlocking file name corresponding to said hardware information of said mobile terminal;

after receiving said matching successful instruction, said website providing a web page according to said unlocking file name for said mobile terminal downloading said network unlocking file, and said mobile terminal downloading said network unlocking file from said web page.

The invention provides a system for a mobile terminal unlocking a network, and said system comprising: a mobile terminal, a network server, and a website providing download of a network unlocking file; wherein, said mobile terminal is configured to, after its network is locked and it is in use, send hardware information to said network server; when network unlocking is needed, log in said website, and after successfully performing hardware information matching through said network server, download a network unlock file from said website, and unlock the network with an unlocking code in said network unlocking file;

said network server is configured to, after receiving a notification from said website, perform hardware information matching, and when the matching is successful, notify said website;

said website is configured to, acquire hardware information of said mobile terminal currently logging in and notify said network server, and after receiving a matching successful instruction from said network server, provide download of said network unlocking file for said mobile terminal.

In the above-mentioned scheme, said network server is further configured to, start up a remaining network locking time-length timer for timing a remaining network locking time length corresponding to said hardware information sent by said mobile terminal.

In the above-mentioned scheme, said network server is specifically configured to, search for hardware information consistent with the hardware information acquired from said website, and when said hardware information is searched out, and if the unlocking state corresponding to said hardware information is locked, and the remaining network locking time length is 0, said matching is successful.

In the above-mentioned scheme, said network server is specifically configured to, after the matching is successful, send to said website a matching successful instruction carrying an unlocking file name corresponding to said hardware information of said mobile terminal.

In the above-mentioned scheme, said website comprises: a user login module, a hardware information acquiring and sending module and an unlocking file downloading module; wherein, said user login module is configured to provide a user name and password input mode, and after said mobile terminal logs in successfully, notify said hardware information acquiring and sending module;

said hardware information acquiring and sending module is configured to provide a web page control for testing said hardware information of said logging-in mobile terminal, and use said web page control to acquire said hardware information of said currently logging-in mobile terminal, and send said hardware information to said network server;

said unlocking file downloading module is configured to, after receiving said matching successful instruction, provide a web page for said mobile terminal downloading said network unlocking file according to said unlocking file name carried in said matching successful instruction.

The invention provides a mobile terminal, and said mobile terminal comprises: an information sending module, a downloading module, and an unlocking module; wherein, said information sending module is configured to, after said mobile terminal is network locked and is in use, send hardware information to a network server;

said downloading module is configured to, when a network needs to be unlocked, log in a website, and after said network server performs hardware information matching and the matching is successful, download a network unlocking file from said website;

said unlocking module is configured to unlock the locked network with said unlocking code in said network unlocking file.

The invention provides a mobile terminal and a network unlocking method and system thereof. After the mobile terminal whose network is locked is in use, the mobile terminal sends its own hardware information to a network server; the network server starts up a remaining network locking time-length timer corresponding to the hardware information, and counts down the remaining network locking time length; when said mobile terminal needs to unlock its locked network, it logs in a website which provides download of a network unlocking file, the website acquires the hardware information of said currently logging-in mobile terminal, and matches the hardware information through the network server; if the matching is successful, the mobile terminal downloads the network unlocking file from the website, and unlocks the locked network with an unlocking code in the downloaded network unlocking file. Therefore, the network unlocking method is not affected by the change of the SIM card, or is restricted by whether the SIM card supports the network unlocking manner or not, hence reducing requirements for the operator server; moreover, with the remaining network locking time-length timer, flexible setting of the network locking time can be achieved.

PREFERRED EMBODIMENTS OF THE INVENTION

The basic idea of the invention is that: after a mobile terminal whose network is locked is in use, hardware information is sent to a network server; when it needs to unlock its network, the mobile terminal logs in a website that provides download of a network unlocking file, the website acquires the hardware information of the currently logging-in mobile terminal, and performs hardware information matching through the network server; when the matching is successful, the mobile terminal downloads the network unlocking file from the website, and unlocks the network with an unlocking code in the network unlocking file. Here, the mobile terminal generally refers to a mobile communication device such as a mobile phone; the network server is typically an operator server.

The invention will be described in further detail below with reference to the accompanying drawings and the specific embodiments.

Figure 1:
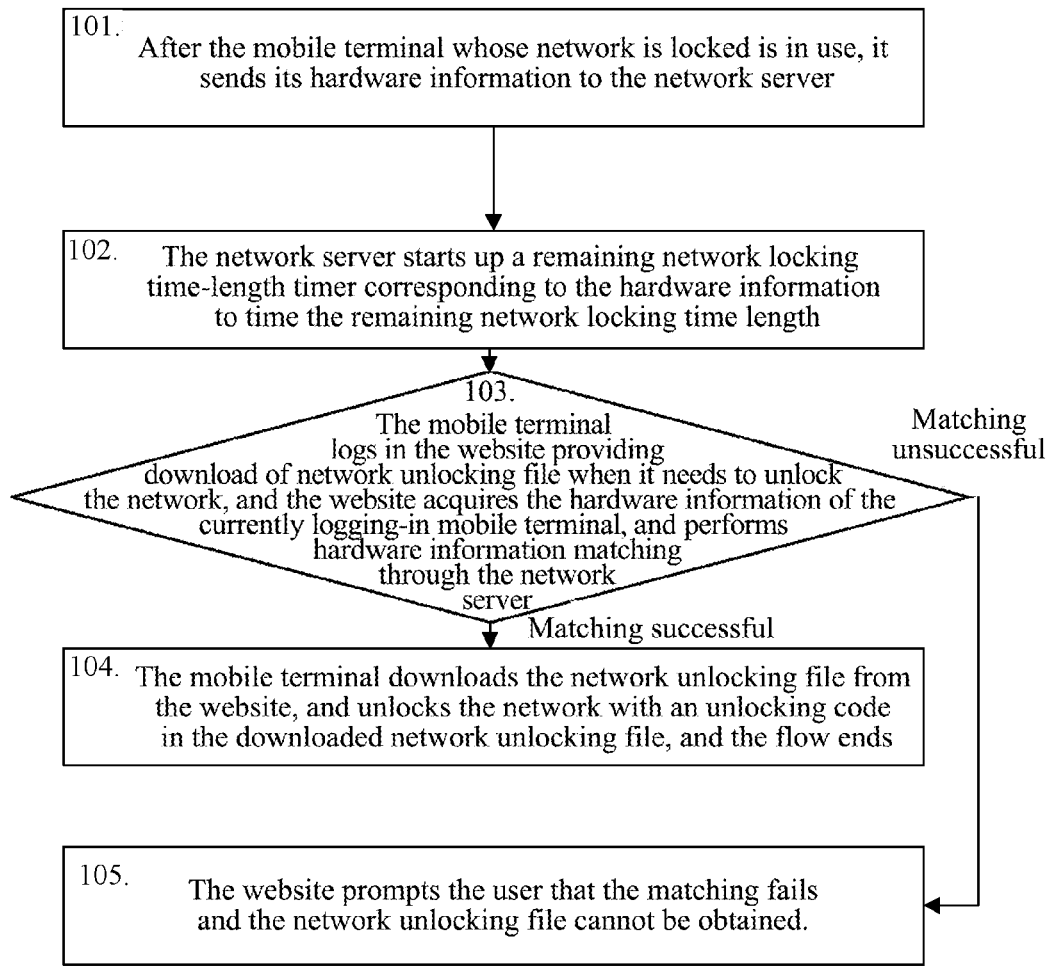
FIG. 1 is a flow chart of a method for a mobile terminal unlocking a locked network in accordance with the invention.

The invention implements a method for a mobile terminal unlocking a network, as shown in FIG. 1, said method comprises the following steps:

In step 101, after a mobile terminal whose network is locked is in use, it sends its hardware information to a network server.

Specifically, after a user acquires and starts to use the mobile terminal whose network has been locked, when the trigger conditions are met, the SMS automatically-sending function built in the mobile terminal automatically sends a short message preset with its own hardware information and the network server number in the background. Wherein, the hardware information comprises at least the IMEI number of the mobile terminal; the trigger conditions are generally set by the operator, such as: sending immediately after searching out the network after booting the mobile terminal, or sending after a preset number of booting times, such as three times, or sending after a preset number of calling times, such as three times, and so on.

In step 102: the network server starts up a remaining network locking time-length timer corresponding to the hardware information, and counts down the remaining network locking time length.

Specifically, the network server pre-records the network unlocking information of the mobile terminal in a database when the user purchases or gets the mobile terminal, and after receiving a short message containing the hardware information transmitted by the mobile terminal, the network server searches out the corresponding remaining network locking time length in the network unlock information according to the acquired hardware information, and in accordance with this remaining network locking time length, starts up the corresponding remaining network locking time-length timer; the remaining network locking time-length timer counts down the remaining network locking time length, and synchronously modifies the value of the remaining network locking time length in the network unlocking information.

The network unlocking information comprises: user name, password, hardware information, unlocking state, remaining network locking time length, and unlocking file name acquired when the user purchases or acquires the mobile terminal for logging in the website for downloading the network unlocking file; specifically, when the hardware information is the IMEI number, the network server records the network unlocking information in a database according to the format of the field shown in Table 1. Table 1 is the format of the field of the network unlocking information recorded by the network server in the database in accordance with an example of the invention.

TABLE 1

| User name | Password | IMEI number | Unlocking state | Remaining network locking time length | Unlocking file name |
| --- | --- | --- | --- | --- | --- |
| Wg1234 | Zte123 | 353801003601471 | locked | 7452 | F3256 |
| . | . | . | . | . | . |
| . | . | . | . | . | . |
| . | . | . | . | . | . |

As shown in Table 1, user name: used to record the user name acquired when the user purchased or obtained the mobile terminal for logging in the website which provides download of the network unlocking file;

password: used to record the password acquired when the user purchases or obtains the mobile terminal for logging in the website which provides download of the network unlocking file;

IMEI number: used to save the IMEI number of the mobile terminal whose network is locked;

unlocking state: the state is identified as "locked" before the user downloads the network unlocking file, and as "unlocked" after download of the network unlocking file is completed;

remaining network locking time length: used to record the unlocking countdown time length, and the remaining network locking time length can be set by the operator according to different conditions, such as: 7452 hours, and so on;

unlocking file name: used to store the name of the network unlocking file of the mobile terminal with the corresponding IMEI number.

In step 103: the mobile terminal logs in the website providing download of the network unlocking file when it needs to unlock the network, the website acquires the hardware information of the currently logging-in mobile terminal, and performs hardware information matching through a network server, if the matching is successful, proceed to step 104; otherwise, proceed to step 105.

Specifically, the mobile terminal needing network unlocking logs in the website that provides download of the network unlocking file, enters the user name and password according to the user name and password entering method provided by the website; after the login is successful, the website provides a web page control that tests the hardware information of the logging-in mobile terminal; after clicking on the web page control, it acquires the hardware information of the currently logging-in mobile terminal, and sends the hardware information acquired from the website that provides download of the network unlocking file to the network server; if the matching is successful, proceed to step 104; otherwise, proceed to step 105;

the matching the hardware information is specifically as follows: the network server searches in the database for hardware information consistent with the hardware information acquired from the website for downloading the network unlocking file, and if the file is searched out, the unlocking state corresponding to the hardware information is "locked", and the remaining network locking time length is 0, then the matching is successful; otherwise, or although the hardware information is searched out, but the unlocking state corresponding to the hardware information is "unlocked", or the remaining network locking time length is not 0, then matching is not successful.

This step further comprises: the website for downloading the network unlocking file sends the user name and password to the network server, and the network server matches the user name and the password at the same time of matching the hardware information.

Step 104: the mobile terminal downloads the network unlocking file from the website, and unlocks the network with the unlocking code in the downloaded network unlocking file, and the flow ends.

Specifically, the network server sends a matching successful instruction carrying the name of the unlocking file corresponding to the hardware information of the mobile terminal to the website that provides download of the network unlocking file, and after the website receives the matching successful instruction, it provides a web page for the mobile terminal to download the network unlocking file in accordance with the unlocking file name; the mobile terminal downloads the network unlocking file from the web page, and after completing downloading the network unlocking file and clicking to execute the network unlocking file, the mobile terminal unlocks the locked network based on the unlocking code carried in the network unlocking file; when the network unlocking is successful, it prompts the user that the network unlocking is successful, and deletes the unlocking code; if the network unlocking fails, it prompts the user that the network unlocking fails, and saves the downloaded network unlocking file, and the flow ends;

This step further comprises: after download of the network unlocking file is completed, the website sends a downloading completed instruction carrying the hardware information of the mobile terminal to the network server, the network server sets the unlocking state in the network unlocking information corresponding to the hardware information of the mobile terminal carried in the downloading completed instruction as "unlocked".

In the above description, the process of network unlocking is a known network unlocking method, and its specific implementation is readily available to one skilled in the field, and thus will not be repeated here.

Step 105: the website prompts the user that the matching fails and the network-unlocking file cannot be obtained.

Figure 2:
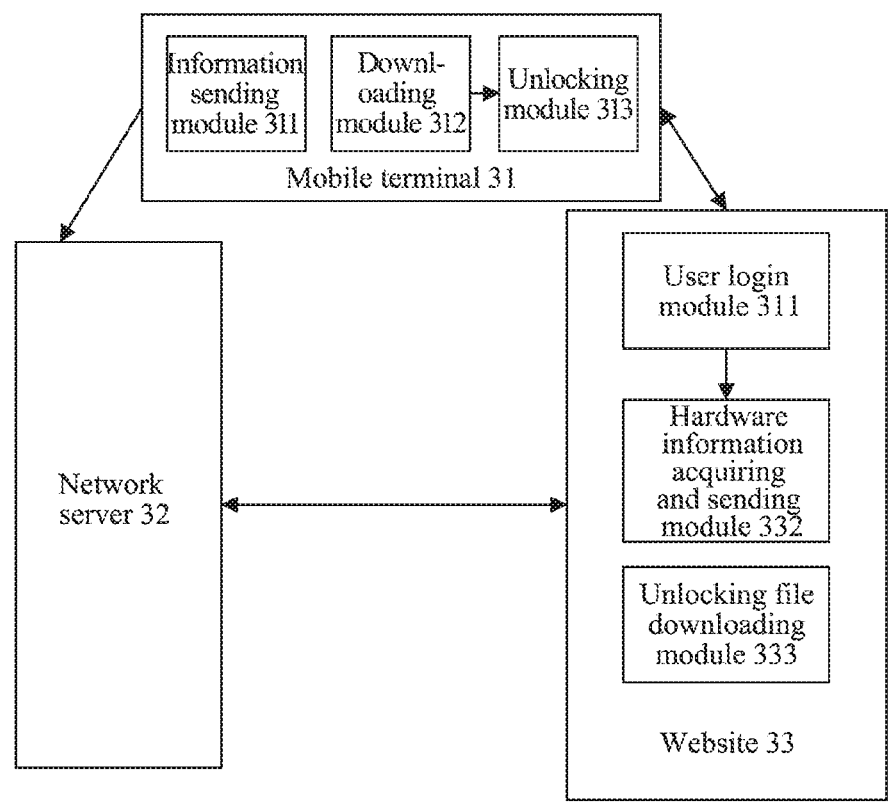
FIG. 2 is a structural diagram of a system for a mobile terminal unlocking a locked network in accordance with the invention.

To achieve the above-mentioned method, the invention also provides a network unlocking system for a mobile terminal. As shown in FIG. 2, the system at least comprises: a mobile terminal 31, a network server 32, a website 33 that provides download of the network unlocking file; wherein, the mobile terminal 31 is configured to, after its network is locked and it is in use, send its hardware information to the network server 32; when it needs to unlock its network, log in the website 33, and after successfully matching the hardware information through the network server 32, download a network unlocking file from the website 33, and unlock the network with an unlocking code in the network unlocking file;

the network server 32 is configured to, after receiving the notification from the website 33, match the hardware information, and when the matching is successful, notify the website 33;

The website 33 is configured to acquire the hardware information of the currently logging-in mobile terminal 31, and notify the network server 32, and after receiving a successful matching notification from the network server 32, provide the download of the network unlocking file for the mobile terminal;

The network server 32 is further configured to, start up the remaining network locking time-length timer corresponding to the hardware information sent by the mobile terminal 31, and time the remaining network locking time length;

specifically, the network server 32 pre-records in the database the network unlocking information of the mobile terminal 31 acquired when the user purchases or obtains the mobile terminal 31, and after receiving a short message including the hardware information sent by the mobile terminal 31, searches out the corresponding remaining network locking time length in the network unlocking information according to the hardware information, and starts up the corresponding remaining network locking time-length timer according to the remaining network locking time length;

the network server 32 is specifically configured to, search the database for hardware information consistent with the hardware information acquired from the website 33, and when the information is searched out, and if the unlocking state corresponding to the hardware information is locked, and the remaining lock network time length is 0, the matching is successful.

the network unlocking information comprises: user name, password, hardware information, unlocking state, remaining network locking time length, and unlocking file name obtained when the user purchases or obtains the mobile terminal 31 for logging in the website 33 that provides download of the network unlocking file;

the hardware information at least comprises the IMEI number;

the network server 32 is specifically configured to, after the matching is successful, send to the website 33 a matching successful instruction carrying the name of the unlocking file corresponding to the hardware information of the mobile terminal 31;

the network server 32 is also configured to, when the matching is not successful, notify the website 33 that the matching is not successful;

correspondingly, the website 33 is also configured to, after receiving the notification that the matching is not successful, prompt the user that the matching fails and the network unlocking file cannot be obtained.

The website 33 is further configured to, after the download of the network unlocking file is completed, send to the network server a download completed instruction carrying the hardware information of the mobile terminal 31;

correspondingly, the network server 32 is also configured to set the unlocking state in the network unlocking information corresponding to the hardware information carried in the download completed instruction as "unlocked".

The mobile terminal 31 comprises an information sending module 311, a downloading module 312, and an unlocking module 313; wherein, the information sending module 311 is configured to, after the mobile terminal is network locked and is in use, send the hardware information to the network server 32;

the downloading module 312 is configured to, when network unlocking is needed, log in the website 33 that provides download of the network unlocking file, and after the network server 32 successfully matches the hardware information, download the network unlocking file from the website 33;

the unlocking module 313 is configured to unlock the network with the unlocking code in the network unlocking file.

The website 33 comprises: a user login module 331, a hardware information acquiring and sending module 332 and an unlocking file downloading module 333; wherein, the user login module 331 is configured to provide the user name and password entering mode, and after the mobile terminal 31 logs in successfully, notify the hardware information acquiring and sending module 332;

the hardware information acquiring and sending module 332 is configured to provide a web page control for testing the hardware information of the logging-in mobile terminal 31, and after clicking the web page control, acquire the hardware information of the currently logging-in mobile terminal 31, and send the hardware information to the network server 32;

the unlocking file downloading module 333 is configured to, after receiving the matching successful instruction, provide a web page for the mobile terminal 31 to download the network unlocking file according to the unlocking file name carried in the matching successful instruction.

The hardware information acquiring and sending module 332 is further configured to send the user name and password to the background network server 32;

correspondingly, the network server 32 is further configured to match the user name and password at the same time of matching the hardware information.

Based on the above-mentioned system, the invention also provides a mobile terminal. As shown in FIG. 2, the mobile terminal 31 comprises: an information sending module 311, a downloading module 312, and an unlocking module 313; wherein, the information sending module 311 is configured to, after the mobile terminal is network locked and is in use, send the hardware information to the network server 32;

the downloading module 312 is configured to, when network unlocking is needed, log in the website 33 providing download of the network unlocking file, and after the network server 32 performs hardware information matching and the matching is successful, download the network unlocking file from the website 33;

the unlocking module 313 is configured to unlock the network with the unlocking code in the network unlocking file.

With the scheme of the invention, when the network needs to be unlocked, the mobile terminal logs in the website that provides download of the network unlocking file, and performs hardware information matching through the network server, and when the matching is successful, downloads the network unlocking file from the website to unlock the locked network. Therefore, the network unlocking method is not affected by the change of SIM card or restricted by whether the SIM card supports the network unlocking method or not, hence reducing the requirements for the operator server.

The above description is only the preferred embodiments of the invention and is not intended to limit the scope of the invention.

What is claimed is:

1. A method for a mobile terminal unlocking a network, after said mobile terminal whose network is locked is in use, said method comprising the following steps of:
    said mobile terminal sending hardware information to a network server;
    said network server pre-recording network unlocking information of said mobile terminal in a database;
    said mobile terminal logging in a website which provides download of a network unlocking file when network unlocking is needed, said website acquiring said hardware information of said mobile terminal that is currently logging in, and performing hardware information matching through said network server, if the matching is successful, said mobile terminal downloading said network unlocking file from said website, and unlocking the network with an unlocking code in said downloaded network unlocking file;
    wherein after said mobile terminal sends said hardware information to said network server, said network server receiving a short message containing said hardware information sent by said mobile terminal, and searching out a corresponding remaining network locking time length in said network unlocking information according to said hardware information, and in accordance with said remaining network locking time length, starting up a remaining network locking time-length timer for timing a remaining network locking time length corresponding to said hardware information.

2. The method according to claim 1, wherein, said network unlocking information comprises: user name, password, hardware information, unlocking state, remaining network locking time length and unlocking file name obtained by a user when the user purchases or obtains said mobile terminal for logging in the website to download said network unlocking file.

3. The method according to claim 1, wherein, said hardware information comprises at least an International Mobile Equipment Identity (IMEI) of said mobile terminal.

4. The method according to claim 1, wherein, the step of performing hardware information matching is: said network server searching in the database for hardware information consistent with said hardware information acquired from said website that provides the download of said network unlocking file, and the matching being successful when said hardware information is searched out and an unlocking state corresponding to said hardware information is locked and the remaining network locking time length is 0.

5. The method according to claim 4, wherein, the step of downloading said network unlocking file from said website is: said network server sending to said website a matching successful instruction carrying an unlocking file name corresponding to said hardware information of said mobile terminal;
    after receiving said matching successful instruction, said website providing a web page according to said unlocking file name for said mobile terminal downloading said network unlocking file, and said mobile terminal downloading said network unlocking file from said web page.

6. A system for a mobile terminal unlocking a network, comprising: a mobile terminal, a network server, and a website providing download of a network unlocking file; wherein,
    said mobile terminal is configured to, after said mobile terminal whose network is locked is in use, send hardware information to said network server; when network unlocking is needed, log in said website, and after successfully performing hardware information matching through said network server, download a network unlock file from said website, and unlock the network with an unlocking code in said network unlocking file;
    said network server is configured to start up a remaining network locking time-length timer for timing a remaining network locking time length corresponding to said hardware information sent by said mobile terminal, and after receiving a notification from said website, perform hardware information matching, and when the matching is successful, notify said website;
    said website is configured to, acquire hardware information of currently logging-in mobile terminal and notify said network server, and after receiving a matching successful instruction from said network server, provide download of said network unlocking file for said mobile terminal;
    wherein said network server is specifically configured to search for hardware information consistent with the hardware information acquired from said website, and when said hardware information is searched out, and an unlocking state corresponding to said hardware information is locked and the remaining network locking time length is 0, said matching is successful.

7. The system according to claim 6, wherein, said network server is specifically configured to, after the matching is successful, send to said website a matching successful instruction carrying an unlocking file name corresponding to said hardware information of said mobile terminal.

8. The system according to claim 7, wherein, said website comprises: a user login module, a hardware information acquiring and sending module and an unlocking file downloading module; wherein,
    said user login module is configured to provide a user name and password input mode, and after said mobile terminal logs in successfully, notify said hardware information acquiring and sending module;
    said hardware information acquiring and sending module is configured to provide a web page control for testing said hardware information of said logging-in mobile terminal, and use said web page control to acquire said hardware information of said currently logging-in mobile terminal, and send said hardware information to said network server;

said unlocking file downloading module is configured to, after receiving said matching successful instruction, provide a web page for said mobile terminal downloading said network unlocking file according to said unlocking file name carried in said matching successful instruction.

9. The system according to claim 6, wherein, said mobile terminal comprises: an information sending module, a downloading module, and an unlocking module; wherein, said information sending module is configured to, after said mobile terminal whose network is locked is in use, send hardware information to the network server;

said downloading module is configured to, when a network needs to be unlocked, log in the website, and after said network server performs hardware information matching and the matching is successful, download the network unlocking file from said website;

said unlocking module is configured to unlock the network with said unlocking code in said network unlocking file.

10. A mobile terminal, comprising: an information sending module, a downloading module, and an unlocking module; wherein, said information sending module is configured to, after said mobile terminal whose network is locked is in use, send hardware information to a network server;

said downloading module is configured to, when a network needs to be unlocked, log in a website, and after said network server performs hardware information matching and the matching is successful, download a network unlocking file from said website;

said unlocking module is configured to unlock the network with an unlocking code in said network unlocking file;

wherein said network server performs hardware information matching and the matching is successful comprises that said network server starts up a remaining network locking time-length timer for timing a remaining network locking time length corresponding to said hardware information sent by said mobile terminal, and searches for hardware information consistent with said hardware information acquired from said website, and when said hardware information is searched out, and an unlocking state corresponding to said hardware information is locked and the remaining network locking time length is 0, said matching is successful.

* * * * *